June 12, 1962
E. MEUTER
3,038,852
DEVICE FOR THE GALVANIZATION OF THE BEARING
SURFACES OF HEAVY AND VERY
HEAVY CRANK SHAFTS
Filed Sept. 22, 1959
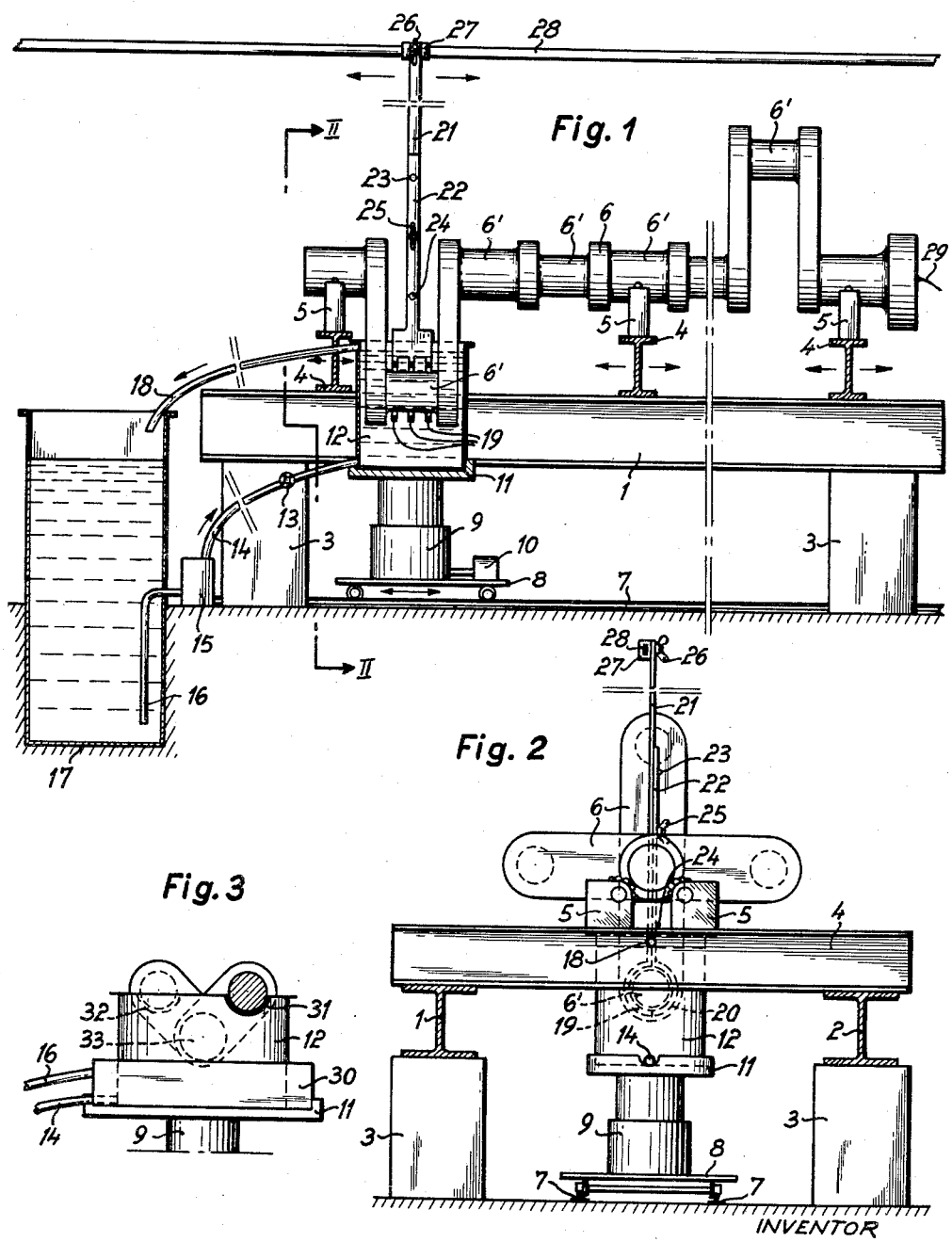
INVENTOR
Ernst Meuter
BY Lowry & Rinehart
ATTYS.

3,038,852
DEVICE FOR THE GALVANIZATION OF THE BEARING SURFACES OF HEAVY AND VERY HEAVY CRANK SHAFTS
Ernst Meuter, 11 Merscheider Busch, Solingen-Merscheid, Germany
Filed Sept. 22, 1959, Ser. No. 841,593
Claims priority, application Germany Sept. 29, 1958
3 Claims. (Cl. 204—224)

The invention relates to a device for the galvanization of the bearing surfaces of heavy and very heavy crank shafts.

Hitherto crank shafts were suspended vertically in appropriately deep baths, for the galvanic treatment of their bearing surfaces. Defects which have a disadvantageous effect especially upon the strength properties of the basic material of the crank shaft and upon the deposit pertain to this process. Thus, for example, it is not possible to prevent the hydrogen gases which form during the galvanization process from accumulating under the crank webs of the shaft, remaining adhering here and penetrating into the crank webs. This has the result that the basic material of the shaft becomes brittle at these points, which often leads to the formation of cracks and fractures. Furthermore, a regular deposit of equal hardness throughout practically cannot be achieved at the individual bearing surfaces of the crank shaft, because the electrolyte column, due to its height necessitated by the vertical position of the crank shaft in the bath, has such different temperatures at the individual bearing surfaces of the shaft which are to be galvanized, that current fluctuations occur within the electrolyte, which result in an irregular deposit, especially if the bearing surfaces possess surface dimensions of different sizes. Furthermore, in view of the vertical position of the crank shaft in the bath, anode leads of different lengths are necessary, whereby differing voltage losses occur, which again result in irregular deposit. Furthermore, for every bearing surface to be galvanized a corresponding anode ring is necessary. This leads as a result of the relatively high purchase costs of the anode rings to a substantial increase in the expense of the galvanization process.

The object of the invention is to avoid these drawbacks and to provide a device for the galvanization of the bearing surfaces of heavy and very heavy crank shafts which is designed for positive operation and long service with a minimum of maintenance being required.

The invention provides a device which consists substantially of an arrangement for supporting a crank shaft having bearing surfaces to be galvanized successively, said arrangement including means displaceable in the horizontal plane and means for axially rotating the crank shaft, a mobile bath adapted to receive one of said bearing surfaces to be galvanized successively, means for lifting the bath, and movable means carrying said latter means.

Since in each case only one bearing surface of the crank shaft is received by the bath, and consequently this bath is only of slight height, the electrolyte column also only possesses a fraction of the height which was hitherto necessary due to the vertical position of the crank shaft in the bath. As a result of the slight height of the electrolyte column the temperature thereof is uniform over its height, so that no current fluctuations occur, and thus a uniform deposit on the bearing surfaces of the shaft is ensured. Furthermore, due to the perpendicular position of the crank webs in the bath resulting from the horizontal position of the crank shaft, the hydrogen gases forming during the galvanization process cannot adhere to the crank webs and thus exert a harmful influence upon these webs. The invention also renders it possible to use short current leads, and more especially current leads of one and the same length, so that voltage differences impairing the quality of the deposit no longer occur. This was not possible hitherto in view of the vertical position of the crank shaft in the bath.

A preferred embodiment of the invention will now be described by way of example and with reference to the accompanying drawings, in which:

FIG. 1 is a longitudinal section through a device according to the invention;
FIG. 2 is a cross section on line II—II of FIG. 1;
FIG. 3 is an elevational view of a bath, in a special embodiment.

The device as illustrated in the drawings consists of two longitudinal H-girders 1 and 2 resting on pedestals 3 and upon which three transverse H-girders 4 rest loosely and thus displaceably in the horizontal plane, in the directions of the arrows. Upon the H-girders 4 there are mounted mountings 5 which are provided with roller bearings upon which a crank shaft 6 is axially rotatable. 7 designates a rail length resting on the ground between the pedestals 3, upon which rail a trolley 8 is movable. Upon the latter there is arranged a lifting cylinder 9 which can be actuated by means of a pump 10. On top of the lifting cylinder 9 there is arranged a platform 11 carrying a bath 12 filled with the electrolyte, in which there hangs a connecting rod bearing 6', of the crank shaft 6. A flexible pipe 14 opens with one of its ends into the bath 12 and is provided with a shut-off cock 13. The other end of the pipe 14 leads to a pump 15 having a suction pipe 16 which opens into a supply container 17 filled with the electrolyte. Near the upper edge of the bath 12 there is connected a flexible pipe 18 serving as overflow, through which the electrolyte pumped from the supply container 17 into the bath 12 flows back again into the supply container 17. The connecting rod bearing 6' is enclosed by three rings serving as anodes, each consisting of two halves 19 and 20, and together forming a cage, of which rings the halves 19 terminate in a current lead 21 and the halves 20 terminate in a current lead 22. The current lead 21 has pegs 23 and 24, on to which the current lead 22 is pushed, the two current leads 21 and 22 being firmly connected with one another by means of a wing screw 25. The current lead 21 is secured by means of a wing screw 26 to a slider 27, which is pushed on to an anode lead bar 28 arranged over the crank shaft 6. 29 designates a cathode lead.

The manner of operation of the device is as follows:
After the crank shaft 6 has been pivoted so far on the bearings of the mountings 5 that a connecting rod bearing 6' is directed vertically downwardly, the current lead 21 on the anode lead bar 28 is pushed to the connecting rod bearing 6', until the halves 19 of the rings serving as anodes surround the connecting rod bearing 6' at the requisite distance. Thereupon the current lead 22 is pushed on to the pegs 23 and 24 of the current lead 21 and firmly connected therewith by means of the wing screw 25, when the other halves 20 of the rings serving as anodes, arranged on the current lead 22, surround the connecting rod bearing 6', so that the anode cage formed by the ring halves 19 and 20 is closed, centrally enclosing the connecting rod bearing 6'. Now the bath 12 is brought beneath the connecting rod bearing 6' by means of the trolley 8, and lifted by means of the lifting cylinder 9 until the connecting rod bearing 6' with the anode cage is washed around by the electrolyte situated in the bath 12, which is fed to the bath 12 from the supply container 17 by means of the pump 15, and flows back again as overflow into the supply container 17. After application of the cathode lead 29 to the crank shaft 6 and switching on of the current the galvanization process commences. After termination of the galvanization process the bath 12 is lowered again by means of the lifting cylinder 9, whereupon the next connecting rod bearing to be galvanized, of the crank shaft 6, is taken under treatment.

In order also to be able to galvanize connecting rod bearings with short webs and the main bearings of such a crank shaft, with the crank shaft in a horizontal position, the bath 12 as illustrated in FIG. 3 has at its upper edge recesses 31 and 32 lined with acid-resistant seals and disposed oppositely, staggered in relation to one another, which serve for the reception of the bearings adjacent to the bearing designated by 33 which is to be galvanized. The bath 12 is set into a tank 30 firmly mounted on the platform of the lifting cylinder 9, which receives the electrolyte overflowing from the bath 12, and feeds it through the flexible pipe 18 to the supply container 17. Thus, in contrast to the bath as illustrated in FIGS. 1 and 2, the internal space of the bath can be utilized completely as regards height.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein. The invention can be applied, for instance, in the same manner also to prior and subsequent treatment work for which a bath is needed, and to electro-polishing.

I claim:

1. Apparatus for uniformly electroplating one at a time a plurality of selected bearing surfaces on a crank shaft, comprising support means for removably receiving the crank shaft and permitting it to be rotated about its axis of rotation, an upwardly opening container adapted to contain therein an electrolytic bath for a single bearing surface beneath said support means, means connected to said container orienting said container vertically and bearing receiving recesses in the upper edges of said container for positioning said container longitudinally relative to said support means for locating each selected bearing surface at the same relative position in said container when being electroplated, and anode and cathode means connectable to the selected bearing areas and crank shaft for passing a current therethrough for electroplating said selected area.

2. The structure of claim 1, said support means comprising a frame including longitudinally spaced, coaxial bearings, said means orienting said container vertically and longitudinally comprising a vertically extendable support engaging said electrolyte container and a carriage guided in a fixed path of travel beneath said bearings and upon which said extendable support is mounted.

3. The structure of claim 2; said electrolytic container including means for circulating the fluid therein, said anode means including portions securable to a selected bearing area of said crank shaft, and a current conductor disposed above said coaxial bearings in alignment with the path of travel of said carriage, and means adjustably connected to said current conductor and said anode means.

References Cited in the file of this patent
UNITED STATES PATENTS

| | | |
|---|---|---|
| 765,001 | Gin | July 12, 1904 |
| 1,880,382 | Garling et al. | Oct. 4, 1932 |
| 2,385,198 | Engle | Sept. 18, 1945 |
| 2,940,917 | Dyson | June 14, 1960 |
| 2,979,452 | Ludwig et al. | Apr. 11, 1961 |

FOREIGN PATENTS

| | | |
|---|---|---|
| 117,302 | Australia | Aug. 5, 1943 |